United States Patent [19]

Okuda

[11] Patent Number: 4,871,471
[45] Date of Patent: Oct. 3, 1989

[54] PHOSPHOR FOR CATHODE RAY TUBE

[75] Inventor: Hiroshi Okuda, Nagaokakyo, Japan

[73] Assignee: Mitsubishi Denki Kabushiki Kaisha, Tokyo, Japan

[21] Appl. No.: 193,441

[22] Filed: May 12, 1988

[30] Foreign Application Priority Data

May 20, 1987 [JP] Japan ................... 62-134275

[51] Int. Cl.$^4$ ............................. C09K 11/84
[52] U.S. Cl. ................. 252/301.4 S; 252/301.4 H; 252/301.6 P
[58] Field of Search ............ 252/301.4 H, 301.4 S, 252/301.6 P

[56] References Cited

FOREIGN PATENT DOCUMENTS 59-102981 6/1984 Japan ..................... 252/301.4 S
61-266488 12/1986 Japan .
1452898 10/1976 United Kingdom ......... 252/301.4 S Primary Examiner—Jack Cooper
Attorney, Agent, or Firm—Sughrue, Mion, Zinn, Macpeak & Seas

[57] ABSTRACT

A novel phosphor for a cathode ray tube comprising $Y_2O_2S:Eu$ containing barium fluoride is disclosed which has a long afterglow, maintains high emission efficiency, and has high color purity.

2 Claims, 2 Drawing Sheets

PHOSPHOR FOR CATHODE RAY TUBE

FIELD OF THE INVENTION

The present invention relates to a novel phosphor for a cathode ray tube. More particularly, the present invention relates to a phosphor for a cathode ray tube having excellent luminance brightness, chromaticity and a long afterglow while maintaining high emission efficiency and high color purity.

BACKGROUND OF THE INVENTION

In recent years, cathode ray tubes for visual display indication have often been employed for the control or monitoring of terminal equipment of a computer or a plant system wherein the display indication is usually a numeral, alphabetic figures, katakara (i.e., the square Japanese syllabary or figure), etc. For this purpose, a color cathode ray tube is particularly advantageous because, from a functional standpoint, it has a great capacity for storing and visualizing a wide variety of information. Also, the display indication can easily be read.

However, some conventional cathode ray tubes are designed to primarily display continuously moving pictures, and therefore, it is desired that afterglows of the respective phosphors emitting different colors are short enough so that they are invisible to the naked eye.

Where, on the other hand, the cathode ray tube for display indication is primarily intended to display letters, characters or figures which are still for a certain period of time (as opposed to continuously moving pictures), it is desirable and beneficial to employ a long-afterglow type phosphor, for several reasons. For example, by employing a phosphor having an adequate long-afterglow, it is possible to reduce the so-called "flickering" of the display image so that the image can more clearly be seen. Further, it is possible to reduce the overall number of picture elements to be transmitted to the screen for display. This is advantageous for two basic reasons: it creates less eye strain for the image reader, and chances of misreading the displayed image will be reduced. Further, the circuit can advantageously be simplified when using a long-afterglow type phosphor.

Representative phosphors currently employed for such a purpose include a green emitting $Zn_2SiO_4$:Mn,As phosphor, and a red emitting $(Zn,Mg)_3(PO_4)_2$:Mn phosphor. The former has $B_{10\%}$ (reduction time of luminance brightness to 10% after cessation of excitation) of 150 msec, while the latter has $B_{10\%}$ of 120 msec. Thus both of these phosphors have satisfactory long afterglow characteristics.

However, the above-mentioned conventional long-afterglow phosphors generally exhibit somewhat poor emission efficiency. Particularly, as the spectral luminous efficacy of the red phosphor is relatively low, its luminance brightness is insufficient from a practical standpoint as compared with the green phosphor. In order to increase the luminance brightness thereof, a short-afterglow red phosphor having high luminance brightness (such as may be used for a color cathode ray tube for a television, for instance), $Y_2O_2S$:Eu, is combined with the long-afterglow red phosphor. This technique is described in Japanese Pat. No. 917125. However, as the afterglow is as short as $B_{10\%}=2$ msec for such a short-afterglow red phosphor, the amount thereof that can be combined with the long-afterglow red phosphor is somewhat limited, and sufficient practical emission efficiency still can not be obtained in accordance with this type of "hybrid" long-short afterglow type phosphor.

U.S. Pat. No. 3,457,184 discloses europium-activated yttrium oxide phosphors which are prepared by a two-stage firing process. First, precipitated compounds of yttrium with europium are heat decomposed to oxides by firing at 600°–1200° C. Then, at least one flux, such as barium fluoride, sodium fluoride, borax, etc., is added within a specific amount, and this mixture is further fired at 1000°–1400° C. However, the emission characteristics of this type of phosphor could still be improved from a commercial view.

More recently, a long-afterglow red phosphor having high luminance comprising a tervalent europium-activated yttrium oxide of the formula $Y_2O_3$:Eu containing at least one member selected from the group consisting of barium fluoride and magnesium fluoride, has been proposed as described in Japanese patent application (OPI) No. 61-266488 laid-open Dec. 26, 1986 (the term "OPI" as used herein refers to a published, unexamined patent application), corresponding to U.S. patent application Ser. No. 06/867,854 filed May 21, 1986. However, there is a problem in that the color tone of the phosphors described therein, such as a $Y_2O_3$:Eu.-$BaF_2$ phosphor, for example, is undesirably shifted to the orange side, as compared with a $Y_2O_2S$:Eu short-afterglow red phosphor. Therefore, room for improvement in the spectral emission characteristics of long-afterglow phosphors clearly exists.

SUMMARY OF THE INVENTION

Accordingly, it is an object of the present invention to provide a novel phosphor for a cathode ray tube having a long afterglow while maintaining high emission efficiency and high color purity.

Another object of the present invention is to provide a novel phosphor for a cathode ray tube which can be easily obtained by firing a trivalent europium-activated yttrium sulfide and oxide of the formula $Y_2O_2S$:Eu with barium fluoride.

Still another object of the present invention is to provide a novel phosphor for a cathode ray tube which is capable of achieving a high luminance brightness.

Yet a further object of the present invention is to provide a novel phosphor for a cathode ray tube wherein the color tone of the phosphor is not shifted to the orange side.

The above and other objects of the present invention are satisfied by a phosphor for a cathode ray tube comprising a trivalent europium-activated yttrium sulfide and oxide of the formula $Y_2O_2S$:Eu containing barium fluoride.

In another embodiment, the present invention is directed to a phosphor for a cathode ray tube which is a mixture comprising a phosphor of a trivalent europium-activated yttrium sulfide and oxide of the formula $Y_2O_2S$:Eu containing barium fluoride, and a phosphor of the formula $(Zn,Mg)_3(PO_4)_2$:Mn.

BRIEF DESCRIPTION OF THE DRAWINGS

In FIGS. 1 and 2, curve (1) shows the attenuation characteristics of the phosphors of the present invention. Straight line (2) shows the attenuation characteristics of the conventional phosphor $(Zn,Mg)_3(PO_4)_2$:Mn, and straight line (3) represents the attenuation characteristics of the conventional phosphor $Y_2O_2S$:Eu.

DETAILED DESCRIPTION OF THE INVENTION

Factors relating to the excitation, emission and afterglow of the phosphors are influenced by the luminescent centers of the composition and the circumference of the crystalline fields in which the luminescent centers are located. It is considered that $BaF_2$ in the phosphor of the present invention substitutes $Ba^{2+}$ for a part of $Y^{3+}$ of the $Y_2O_2S$ crystalline matrix, and substitutes $F^-$ for a part of $O^{2-}$ lattice sites. The cause of the afterglow is considered to be that the ionic radius of $Ba^{2+}$ (1.34 Å) is substantially different from the ionic radius of $Y^{3+}$ (0.893 Å), although the cause may also be attributable to the difference in the electric charge at different sites on the crystal lattice. This can be inferred from the fact that a fluoride of Ca or Sr having an ionic radius closer to that of $Y^{3+}$, i.e., $Ca^{2+}$ (0.99 Å) or $Sr^{2+}$ (1.12 Å), does not provide an afterglow which can adequately be observed with the naked eye as in the case of $BaF_2$, despite the fact that Ca and Sr are homologues of Ba, even though a slight afterglow may be observed.

A suitable amount of barium fluoride to be incorporated into the $Y_2O_2S$:Eu phosphor to form the novel phosphor of the present invention upon firing is from about 0.1 to about 5.0 wt% $BaF_2$ based on the weight of $Y_2O_2S$:Eu phosphor. Amounts below about 0.1 wt% $BaF_2$ are undesirable in that the afterglow becomes as weak as about 10 msec of $B_{10\%}$, whereby a reduction of flickering is hardly observed. Amounts above about 5.0 wt% $BaF_2$ are undesirable in that if more barium fluoride than this is present, the emission luminance brightness of the phosphor becomes as low as about 80% of the emission luminance brightness of the above-mentioned conventional short afterglow-red phosphor $Y_2O_2S$:Eu. The above amounts are represented by % by weight of barium fluoride relative to the $Y_2O_2S$:Eu phosphor.

Figure 4:
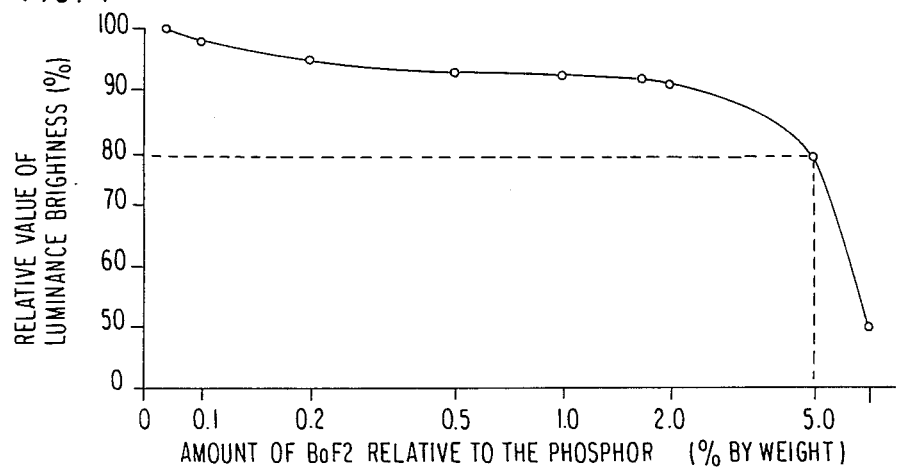
FIG. 4 is a graph showing the emission luminance brightness corresponding to the amount of barium fluoride that is incorporated in the phosphors of the present invention, wherein the emission luminance brightness of $Y_2O_2S$:Eu under excitation is taken as 100 and the emission luminance brightness of $Y_2O_2S$:Eu containing barium fluoride is represented by values relative to the emission luminance brightness of $Y_2O_2S$:Eu without barium fluoride.
Figure 3:
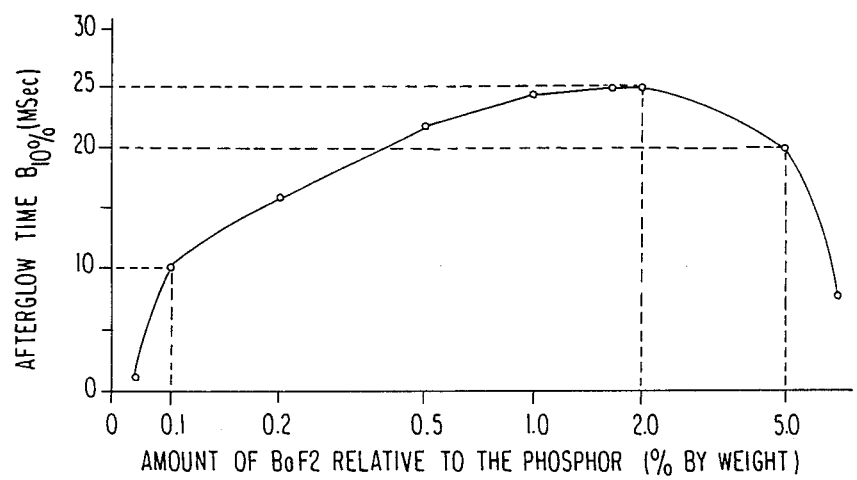
FIG. 3 is a graph showing the time of the afterglow corresponding to the amount of barium fluoride that is incorporated in the phosphors of the present invention.

The lower and upper limits as to suitable amounts of $BaF_2$ noted above are based on the data shown in FIGS. 3 and 4. FIG. 3 is a graph depicting changes over time of the afterglow corresponding to the amount of barium fluoride present in the phosphor of the present invention. FIG. 4 is a graph showing changes in the emission luminance brightness corresponding to the amount of barium fluoride present in the phosphor of the present invention, wherein the emission luminance brightness of $Y_2O_2S$:Eu containing no barium fluoride under excitation is taken as 100, and the emission luminance brightness of $Y_2O_2S$:Eu containing barium fluoride is represented by values relative to the emission luminance brightness of $Y_2O_2S$:Eu containing no barium fluride.

Referring to FIG. 3, the time of the afterglow $B_{10\%}$ (msec.) is short, i.e., 10 msec. or less, when the amount of $BaF_2$ relative to the phosphor (% by weight) is less than about 0.1% by weight. The time of the afterglow $B_{10\%}$ also decreases radically when the amount of $BaF_2$ relative to the phosphor is more than about 5.0% by weight. Referring to FIG. 4, the relative value of the emission luminance brightness decreases radically when the amount of $BaF_2$ relative to the phosphor is more than about 5.0% by weight.

The temperature and time for the firing step are not critical. However, if the firing temperature is about 1200° C. or lower, an inadequate solid phase reaction of barium fluoride is obtained so that the characteristics of the resulting phosphors in both emission luminance brightness and afterglow will be relatively poor. On the other hand, if the firing temperature is about 1450° C. or higher, the crystal growth will be excessive, and sintering will partially result in the phosphor. Accordingly, a more preferred temperature range is from 1300° to 1400° C. The firing time should be controlled depending upon the amount of ingredients to be fired.

The present invention will be described in detail hereinafter with reference to specific examples. However, it will be understood that the present invention is by no means restricted or limited in any manner by these examples. Unless otherwise indicated, all partes, percents, ratios and the like are by weight.

EXAMPLE 1

250 mg of $BaF_2$ and 40 ml of ethanol were added to 15 g of $Y_2O_2S$:Eu phosphor, and the mixture thus obtained was mixed in a mortar and dried. The dried mixture was charged into a crucible made of alumina and fired in a weakly reducing atmosphere such that the mixture did not oxidize (for instance, the weakly reducing atmosphere may comprise a relatively small amount of $H_2$ in an $N_2$ atmosphere) at 1350° C. for one hour by an electric furnace. The phosphor substance thus obtained emitted a clear red light under cathode ray excitation, and the afterglow was clearly visually observed by the naked eye. According to the results of the experiment, the emission luminance brightness of the phosphor of this exmple under such cathode ray excitation was measured to be 300 relative to the emission luminance brightness of a conventional long-afterglow red phosphor $(Zn,Mg)_3(PO_4)_2$:Mn established as 100, and $B_{10\%}$ was 25 msec. Further, it took about 120 msec. for the luminance brightness of the resulting phosphor of this example to drop to the same level, in terms of $B_{10\%}$, as the luminance brightness of the above-mentioned conventional $(Zn,Mg)_3(PO_4)_2$:Mn phosphor. The phosphor of this example also emitted the same amount of and degree of color as a conventional $Y_2O_2S$:Eu phosphor, and further did not discolor over time, whereas the conventional $Y_2O_3$:Eu.$BaF_2$ phosphor did undergo discoloration.

EXAMPLE 2

45.16 g (0.2 mol) of yttrium oxide and 2.82 g (0.008 mol) of europium oxide were added to 400 ml of pure (distilled) water, and 80 ml of nitric acid (specific gravity: 1.42, concentration: 70%) were added thereto. The mixture was heated and then stirred. Separately, 84 g of oxalic acid were dissolved in 1.5 liter of pure water under heating. The two solutions were mixed and stirred at a liquid temperature of from 85° to 95° C. The stirring was continued for 30 minutes, whereafter precipitates were collected by filtration, washed with pure water and then dried at 100° C. to obtain coprecipitated oxalates of yttrium and europium. 250 mg of barium fluoride and 40 ml of ethanol were added to 50 g of the coprecipitated oxalates of yttrium and europium, and the mixture thus obtained was mixed in a mortar and dried. The dried mixture was charged into a crucible made of alumina, and fired in a $H_2S$ atmosphere at 1400° C. for one hour by an electric furnace. The phosphor substance thus obtained showed the same emission properties as in Example 1.

EXAMPLE 3

22.58 g (0.1 mol) of yttrium oxide, 1.41 g (0.004 mol) of europium oxide and 250 mg of $BaF_2$ were weighed out and then charged into a ball mill pot, pulverized and mixed. The mixed powder was charged into a crucible made of alumina and fired in an $H_2S$ atmosphere at 1400° C. for one hour by an electric furnace. The phosphor substance thus obtained showed the same emission properties as in Example 1.

EXAMPLE 4

The phosphors obtained in Examples 1-3 were subjected to x-ray diffraction to examine changes in their crystal lattices. As a result, almost no substantial differences as to x-ray diffraction patterns were observed between the $BaF_2$-containing phosphors of the present invention and conventional $Y_2O_2S$:Eu phosphors containing no barium fluoride.

The characteristics of the phosphor of the present invention obtained as described above were measured as applied to a cathode ray tube. The results are shown in Table 1 below:

TABLE 1

| | Relative value of brightness (%) | Peak of emission wavelength (nm) | Value of CIE chromaticity X | Value of CIE chromaticity Y | Afterglow time $B_{10\%}$ (msec.) |
| --- | --- | --- | --- | --- | --- |
| Phosphor of the present invention $Y_2O_2S$:Eu.$BaF_2$ | 300 | 626* | 0.630 | 0.340 | 25 |
| Conventional phosphor (I) $(Zn,Mg)_3(PO_4)_2$:Mn | 100 | 628 | 0.650 | 0.330 | 120 |
| Conventional phosphor (II) $Y_2O_2S$:Eu | 330 | 626* | 0.630 | 0.340 | 1 |
| Conventional phosphor (III) | 301 | 611* | 0.640 | 0.353 | 25 |

TABLE 1-continued

| | Relative value of brightness (%) | Peak of emission wavelength (nm) | Value of CIE chromaticity X | Value of CIE chromaticity Y | Afterglow time $B_{10\%}$ (msec.) |
| --- | --- | --- | --- | --- | --- |
| $Y_2O_3$:EU.$BaF_2$ | | | | | |

*indicates the main peak

Figure 2:
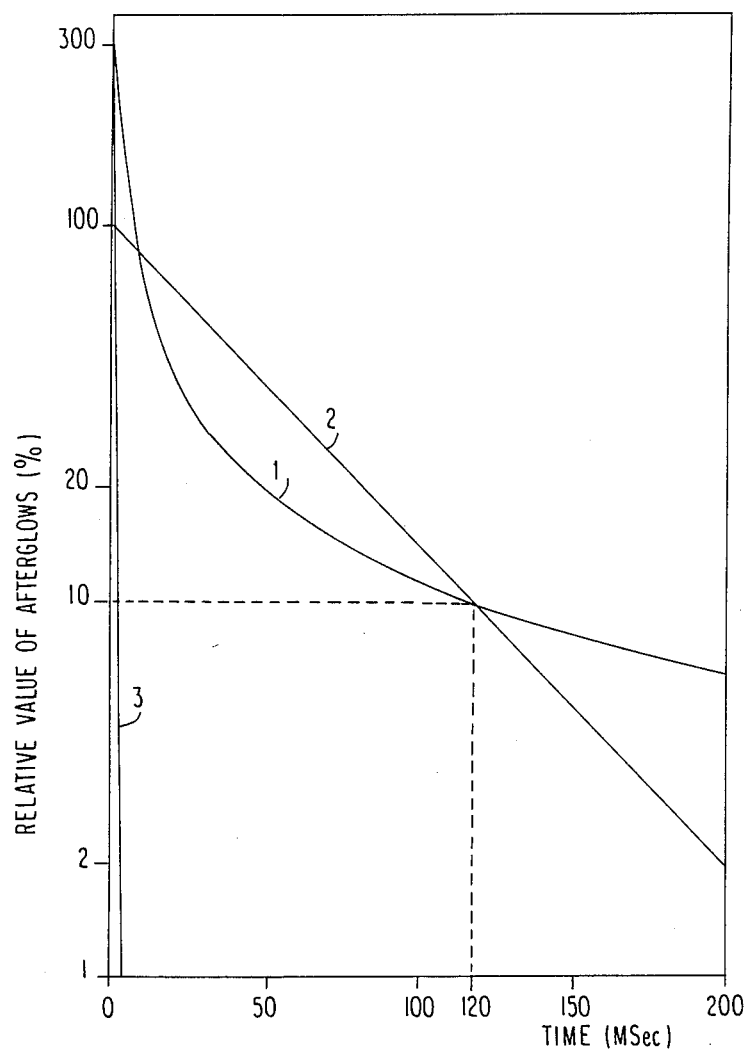
FIG. 2 is a graph showing the attenuation characteristics of the afterglows of the same phosphors as in FIG. 1, but wherein the emission luminance brightness of $(Zn,Mg)_3(PO_4)_2$:Mn under excitation is taken as 100 and the emission luminance brightness of the other two phosphors is represented by values relative to the emission luminance brightness of $(Zn,Mg)_3(PO_4)_2$:Mn.
Figure 1:
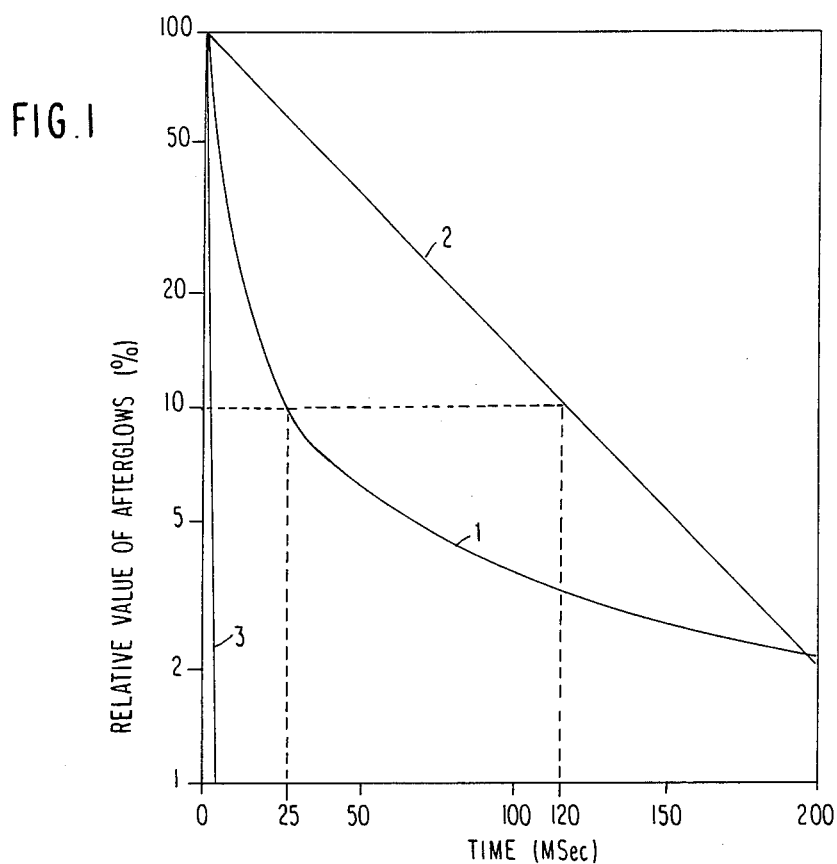
FIG. 1 is a graph showing the attenuation characteristics of the afterglows of the phosphors of the examples of the present invention and of two conventional phosphors: $(Zn,Mg)_3(PO_4)_2$:Mn and $Y_2O_2S$:Eu, wherein the attenuation of the afterglow of each phosphor is represented by the relative luminance brightness of the afterglow, taking the emission luminance brightness of the phosphor under excitation as 100.

Referring to the accompanying drawings, FIGS. 1 and 2 are graphs of the attenuation characteristics of afterglows after cessation of excitation, showing comparisons between the phosphors of the present invention and conventional phosphors.

FIG. 1 is a graph showing the attenuation characteristics of the afterglows of the phosphors of the examples of the present invention and of conventional phosphors $(Zn,Mg)_3(PO_4)_2$:Mn and $Y_2O_2S$:Eu, wherein the attenuation is represented by the relative luminance brightness of the afterglow of each phosphor based on the emission luminance brightness of the phosphor under excitation being taken as 100. FIG. 2 is a graph showing the attenuation characteristics of afterglows of the same phosphors as in FIG. 1, but the emission luminance brightness of $(Zn,Mg)_3(PO_4)_2$:Mn under excitation is established as 100, and the emission luminance brightness of the other two phosphors is represented by values relative to the emission luminance brightness of $(Zn,Mg)_3(PO_4)_2$:Mn.

It is evident from Table 1 and the data shown in FIGS. 1 and 2 that the phosphors of the present invention have desirably long afterglows, while maintaining high emission efficiencies. Referring to the value of CIE chromaticity in Table 1, the color tones of the phosphors of the present invention are not shifted to the orange side as compared with a conventional $Y_2O_3$:Eu.$BaF_2$ phosphor. This is an unexpected discovery, considered to be due to the presence of sulfur atoms on the crystal lattice. The phosphors of the present invention are seen to have the same value of CIE chromaticity as a conventional $Y_2O_2S$:Eu phosphor and also maintain high color purity.

In another embodiment of the present invention, the phosphor of the present invention obtained as described above was mixed with a conventionally employed long afterglow red phosphor $(Zn,Mg)_3(PO_4)_2$:Mn, and the mixture was applied to form a phosphorescent screen by a well-known coating technique. The screen was then applied to a color cathode ray tube for display indication, whereby excellent results were obtained with respect to the brightness, color tone, and prevention of flickering and deterioration of the display image. The present invention thus also has a substantial industrial value in future applications in this field.

As described in the foregoing, the present invention provides a novel phosphor for a cathode ray tube which avoids the above-noted problems associated with previous phosphors. The present phosphor can conveniently be obtained by firing the trivalent europium-activated yttrium sulfide and oxide of the formula $Y_2O_2S$:Eu containing barium fluoride. Thus, the present invention provides a novel phosphor for a cathode ray tube having a long afterglow while maintaining high emission efficiency and high color purity.

While the present invention has been described in detail above and with reference to specific embodiments, it will be understood by one of ordinary skill in the art that various modifications can be made thereto without departing from the spirit and scope thereof.

What is claimed is:

1. A phosphor for a cathode ray tube comprising $Y_2O_2S$:Eu and from about 0.1 to about 5.0 wt.% barium fluoride based on the weight of the $Y_2O_2S$:Eu, said phosphor being obtained by firing a mixture of a trivalent europium-activated yttrium sulfide and oxide phosphor of the formula $Y_2O_2S$:Eu and from about 0.1 to about 5.0% by weight barium fluoride based on the weight of said $Y_2O_2S$:Eu, said firing being conducted at a temperature of from about 1300° C. to about 1400° C. in a weakly reducing atmosphere, said atmosphere preventing the oxidation of said mixture.

2. A phosphor according to claim 1, further comprising, in admixture, a phosphor of the formula $(Zn,Mg)_3(PO_4)_2$:Mn.

* * * * *